(12) United States Patent
Spector

(10) Patent No.: US 6,970,922 B1
(45) Date of Patent: Nov. 29, 2005

(54) NETWORK FOR TARGETING INDIVIDUAL OPERATING A MICROCOMPUTER REGARDLESS OF HIS LOCATION

(76) Inventor: Donald Spector, 380 Mountain Rd., Union City, NJ (US) 07080

( * ) Notice: Subject to any disclaimer, the term of this patent is extended or adjusted under 35 U.S.C. 154(b) by 0 days.

(21) Appl. No.: 09/384,154

(22) Filed: Aug. 27, 1999

(51) Int. Cl.[7] ............................................. G06F 13/00
(52) U.S. Cl. ...................................... 709/223; 705/10
(58) Field of Search ................................. 705/14, 1, 10, 705/26, 27, 35; 713/202; 340/905; 399/366; 455/456, 517; 701/202; 709/219, 217, 223

(56) References Cited

U.S. PATENT DOCUMENTS

| | | | | |
|---|---|---|---|---|
| 5,649,300 A | * | 7/1997 | Snyder et al. | 455/517 |
| 5,754,933 A | * | 5/1998 | Orndorff | 399/366 |
| 5,991,735 A | * | 11/1999 | Gerace | 705/10 |
| 6,014,090 A | * | 1/2000 | Rosen et al. | 340/905 |
| 6,055,504 A | * | 4/2000 | Chou et al. | 705/1 |
| 6,055,513 A | * | 4/2000 | Katz et al. | 705/26 |
| 6,101,486 A | * | 8/2000 | Roberts et al. | 705/27 |
| 6,208,866 B1 | * | 3/2001 | Rouhollahzadeh et al. | 455/456 |
| 6,324,650 B1 | * | 11/2001 | Ogilvie | 713/202 |
| 6,370,514 B1 | * | 4/2002 | Messner | 705/14 |
| 6,405,126 B1 | * | 6/2002 | Palomo et al. | 701/202 |
| 6,505,046 B1 | * | 1/2003 | Baker | 455/456 |
| 6,505,168 B1 | * | 1/2003 | Rothman et al. | 705/10 |
| 6,571,279 B1 | * | 5/2003 | Herz et al. | 709/217 |

\* cited by examiner

*Primary Examiner*—John Follansbee
*Assistant Examiner*—Jungwon Chang
(74) *Attorney, Agent, or Firm*—Glen M. Diehl; Norton & Diehl LLC

(57) ABSTRACT

A network adapted to target an individual operating a microcomputer that is microwave linked to an Internet highway to offer this individual goods or services appropriate to his needs that are available at a place within reach of the individual's present location. The microcomputer is provided with a GPS receiver that indicates the present location of the individual, this location and the identity of the individual being transmitted from the microcomputer to a web site on the highway. At the web site, a computer associated with a data bank storing the profiles of a multitude of consumers is programmed to find out whether the identified individual is included in the data bank, and to determine from his profile whether there are available at a place reachable from his present location appropriate goods or services. If a match is found, an offer to supply such goods or services is conveyed from the web site to the microcomputer.

4 Claims, 1 Drawing Sheet

NETWORK FOR TARGETING INDIVIDUAL OPERATING A MICROCOMPUTER REGARDLESS OF HIS LOCATION

BACKGROUND OF THE INVENTION

1. Field of Invention

This invention relates generally to a network in which a microcomputer is microwave linked to an Internet highway, and more particularly to a network of this type adapted to target the individual operating the microcomputer in order to offer to supply him with goods or services that are available at a place within range of the individual's present location.

2. Status of Prior Art

Internet is a world-wide information highway interlinking millions of computer terminals, each having many users. Associated with Internet are various commercially-operated on-line services, such as Prodigy, CompuServe and Online. One important use to which internet is put is the retrieval of information from electronic libraries and other data bases, thereby giving each terminal access to a vast treasury of information.

The term lap-top computer originally referred to a microcomputer small enough to be used on a person's lap. But this term is currently applicable to any self-sufficient, portable computer that can be carried to any desired site and operated at that site.

It is now known to microwave-link a lap-top computer to an Internet highway in a manner similar to that by which a cellular radiotelephone is coupled to a telephone system. When, therefore, a lap-top computer is linked by a microwave transceiver to an Internet highway it then has access to the same data bases that are accessible to standard computer terminals that are effectively wired into this highway.

In a network in accordance with the invention, a lap-top or portable computer that is microwave-linked to an Internet highway is provided with a GPS receiver that determines the exact present location of the individual operating the microcomputer. Thus if the individual is operating the microcomputer at Niagara Falls in Buffalo, N.Y., or at the corner of 5th Avenue and 42nd Street, in New York City, the GPS receiver will so indicate.

GPS refers to a global positioning system formed by a constellation of 24 satellites which orbit the Earth twice a day and continuously broadcast high-frequency radio signals. These signals contain position and time data enabling a GPS ground receiver to determine the location of the receiver anywhere on Earth.

Each point on Earth can be identified by a specific address which represents the exact spot where a horizontal line (latitude) intersects a vertical line (longitude). The basis for GPS technology is precise timing and position information, each satellite broadcasting its time and particular position.

Data bases are now available that have been developed and are maintained by market research agencies. These bases contain the profiles of a multitude of consumers for various types of goods and services. Each profile usually affords a dossier of the individual, giving his age, marital status, credit rating, preferences in food, music and art, taste in clothing and whatever other information is gained in the course of market research.

Thus by scanning a data base containing the profiles of consumers in a certain age bracket living in a given region, one can extract from this data base those consumers in that region who are potential customers for, say an expensive high-fidelity radio, or for a medium-priced automobile. Armed with this information, an advertizer can focus his mailings to those individuals who are the most likely prospects for the advertized products or services.

SUMMARY OF INVENTION

In view of the foregoing, the main object of this invention is to provide a network adapted to target an individual operating a lap-top computer that is microwave-linked to an Internet highway.

More particularly, the object of this invention is to provide a network of the above type that serves to offer the targeted individual goods or services that are appropriate to his needs and are available at a place within easy reach of his present location.

Also an object of this invention is to provide a lap-top computer with a radio transceiver to microwave-link the computer to an Internet highway, and with a GPS receiver to indicate the present location of the individual operating the computer, whereby the location of the individual to be targeted and his identity can be transmitted to a web site on the highway.

Briefly stated, these objects are attained by a network adapted to target an individual operating a microcomputer that is microwave-linked to an Internet highway to offer this individual goods or services appropriate to his needs available at a place within range of the individual's present location. The microcomputer is provided with a GPS receiver that indicates the present location of the individual, this location and the identity of the individual being transmitted from the microcomputer to a web site on the highway.

At the web site, a computer associated with a data bank storing the profiles of a multitude of consumers is programmed to find out whether the identified individual is included in the data bank, and to determine from his profile whether there are available at a place reachable from his present location appropriate goods or services. If a match is found, an offer to supply such goods or services is conveyed from the web site to the microcomputer.

BRIEF DESCRIPTION OF THE DRAWING

For a better understanding of the invention as well as other objects and further features thereof, reference is made to the following detailed description to be read in conjunction with the accompanying drawing.

DESCRIPTION OF INVENTION

Figure 1:
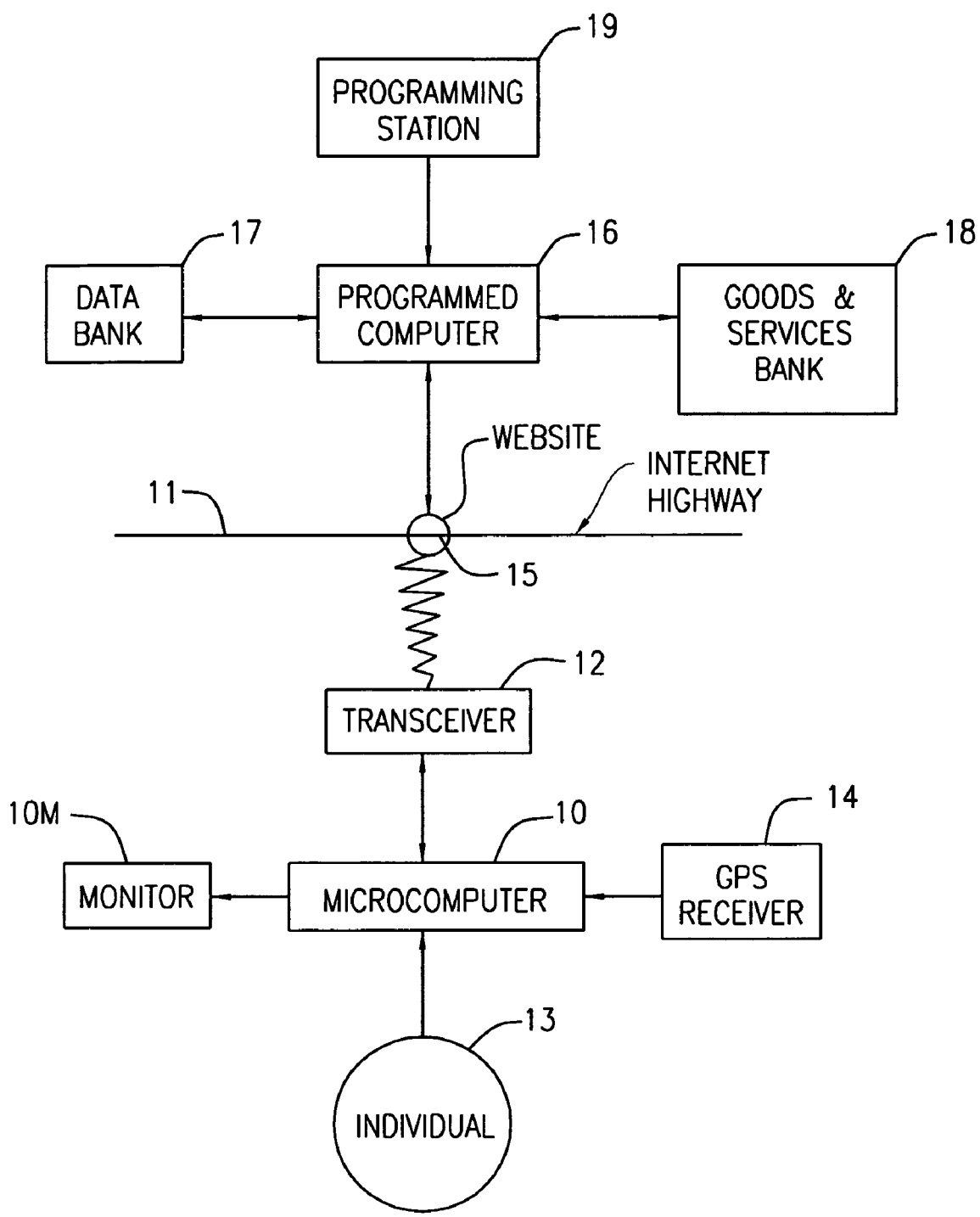
FIG. 1 illustrates in block diagram form a network in accordance with the invention.

Referring now to the drawing illustrating a network in accordance with the invention, included in this network is a lap-top computer or other self-sufficient, portable microcomputer 10 provided with a visual monitor 10M having a screen. The computer may be operated by an individual 13 at whatever site to which he takes the computer, such as at an office, at a hotel or motel room or at a public park. But wherever the individual happens to be, the network is informed of his whereabouts.

Lap-top computer 10 is microwave-linked to an Internet highway 11 by a radio-transceiver 12 so that the computer and the highway can communicate with each other. Thus lap-top computer 10 which is provided with an E-mail address has access to the same services and sources of information provided by Internet to a standard computer terminal. Thus if the individual is named John Smith, his E-mail address might be WWW.JOHNSMITH.COM. But this E-mail address is a true address, for it shows not only the name of the address but also his location.

Associated with lap-top computer is a GPS receiver 14 that picks up radio signals providing positional and time information from satellites, the receiver acting to fix the exact location of the individual operating the computer. In practice, the present location of the individual may be shown on the screen of the computer monitor 10M. Thus if computer 11 equipped with a GPS receiver 14 is carried on board a vehicle or a ship, it then becomes a navigational aid, for one is then given with the exact geographic location of the vehicle or ship.

The exact present location of the individual and his identification are conveyed by microwave transceiver 17 to a web site 15 on the Internet highway. Installed at the web site in a programmed computer 16 associated with a data bank 17. Data bank 17 has stored therein the names of millions of consumers and their respective profiles, including such personal data as bank and credit card information, spending habits, personal interests and whatever other information is collected on each individual by market research activity. The present nature of these data banks is such as to in many cases provide a dossier on each listed individual.

Programmed computer 16 scans the data bank to find and select for analysis the name of the individual 13 operating the lap-top computer. From the profile of the selected individual the computer determines in connection with a data bank 18 of goods and services available at different locations, whether these goods or services are appropriate to this individual and whether they are at a place easily reachable from the present location of the individual. How computer 16 is to be programmed is controlled by a programming station 19.

For example, if the profile indicates that the individual is a middle aged, well-to-do business man and his present location is in midtown New York City, then programmed computer 16 will transmit from web site 15 to microcomputer 10 an invitation to this individual to have lunch at a nearby restaurant at a substantial discount which will be given by presenting the restaurant with a code number. Or the offer may take the form of an invitation to purchase designer clothing at a discount at a nearby boutique.

In the well-known Zagat guide to New York City restaurants, there is included a breakdown of restaurants by districts, such as midtown, upper east side, downtown, etc.

Hence with respect to restaurants there is no difficulty when the present location of an individual operating the computer is within an established district, for the network will then invite the individual to that restaurant that is compatible with his profile. Thus it would be appropriate to invite a wealthy individual to an expensive five-star French-restaurant, not to a Bistro.

Essential to the invention is a computer program capable of analyzing an individual's profile to determine which appropriate goods or services are compatible with his consumer habits and his financial ability to pay for these goods or services.

While there has been shown a preferred embodiment of network for targeting individual operating a microcomputer regardless of his location in accordance with the invention, it will be appreciated that many changes and modifications may be made therein without, however, departing from the essential spirit thereof.

I claim:

1. A network for targeting an individual operating a microcomputer in order to offer to supply said individual with appropriate goods or services available at a place within reach of the individual's present location, comprising:

means associated with the microcomputer to microwave-link the microcomputer to an internet highway;

a GPS receiver to indicate the individual's present location;

means to convey over the microwave link from the microcomputer to a web site on the Internet highway, an identification of the individual and the individual's present location, thereby providing his full address;

means at the website storing profiles of a multitude of individuals who are consumers of the goods or services to determine from the profile of individual whose address has been forwarded to the web site, which goods or services are appropriate to said individual and are available at a place reachable from his present address; and means to convey from the web site to the microcomputer an offer to supply said goods or services, said offer being conveyed automatically by said conveying means in response to determining which good or services is appropriate for said individual.

2. A network as set forth in claim 1, in which said microwave-link is provided by a radio receiver.

3. A network as set forth in claim 1, in which said microcomputer has an e-mail address that identifies the individual.

4. A network as set forth in claim 1, in which said profiles are stored in a data bank.

* * * * *